United States Patent [19]

Pong et al.

[11] Patent Number: 4,951,985
[45] Date of Patent: Aug. 28, 1990

[54] BUMPER FOR IMPACT DETECTION

[75] Inventors: William Pong, Brookfield Center; William S. Kazman, Danbury, both of Conn.

[73] Assignee: Transitions Research Corporation, Danbury, Conn.

[21] Appl. No.: 265,784

[22] Filed: Nov. 1, 1988

[51] Int. Cl.5 ...................... B60R 19/00; B60R 19/03
[52] U.S. Cl. ........................................ 293/102; 293/2; 293/4; 293/120; 73/12; 200/61.43; 200/61.44; 324/716; 338/114; 901/1
[58] Field of Search ...................... 293/2, 4, 102, 117, 293/120; 200/61.44, 61.43; 414/5; 180/274; 901/1, 49; 338/99, 110, 114, 71, 72; 73/12; 324/65 P

[56] References Cited

U.S. PATENT DOCUMENTS

| | | | |
|---|---|---|---|
| 3,315,050 | 4/1967 | Miller | 200/61.43 |
| 3,321,592 | 5/1967 | Miller | 200/61.43 |
| 3,599,744 | 8/1971 | Satterfield et al. | 180/279 |
| 3,895,288 | 7/1975 | Lampen et al. | 338/119 X |
| 3,971,873 | 7/1976 | Price | 293/102 X |
| 4,314,227 | 2/1982 | Eventoff | 338/114 X |
| 4,397,372 | 8/1983 | De Kraker | 200/61.44 X |
| 4,414,984 | 11/1983 | Zarudiansky | 128/774 |
| 4,546,840 | 10/1985 | Yukishige et al. | 180/169 |
| 4,596,412 | 6/1986 | Everett et al. | 293/4 |
| 4,635,982 | 1/1987 | Feldmann et al. | 293/2 |
| 4,695,963 | 9/1987 | Sagisawa et al. | 414/5 X |
| 4,793,193 | 12/1988 | Borgudd | 338/99 X |
| 4,811,979 | 3/1989 | Peter et al. | 293/102 |

FOREIGN PATENT DOCUMENTS

| | | | |
|---|---|---|---|
| 2512407 | 3/1983 | France | 293/2 |
| 54-6255 | 1/1979 | Japan | 293/2 |
| 1380968 | 1/1975 | United Kingdom | 200/61.44 |

Primary Examiner—Margaret A. Focarino
Assistant Examiner—Andrew C. Pike
Attorney, Agent, or Firm—Kramer, Brufsky & Cifelli

[57] ABSTRACT

A bumper for impact detection with an object is disclosed. An electrically conductive member has a compressible, electrically conductive material mounted thereto. An insulator formed of mesh material is sandwiched between the electrically conductive member and the electrically conductive material for electrically insulating the member and the material when the member is in a non-compressed state and to provide electrical conduction between the member and the material when the conductive material is in a compressed state.

30 Claims, 3 Drawing Sheets

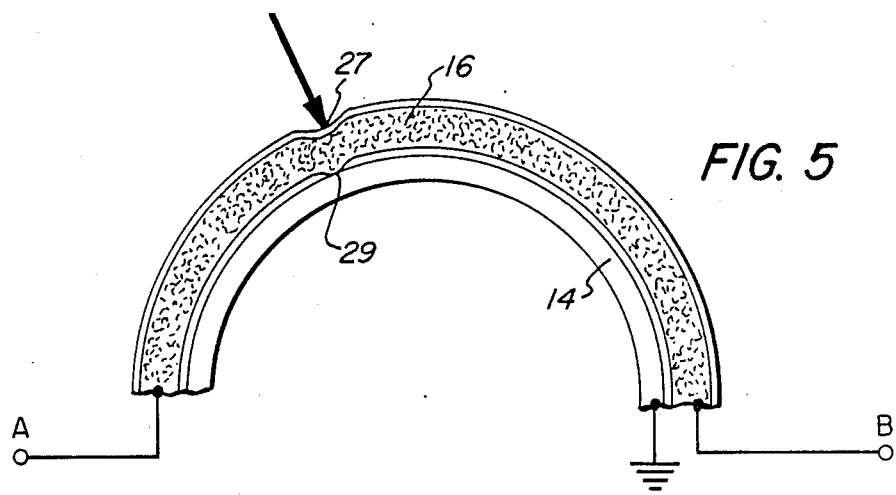
FIG. 5
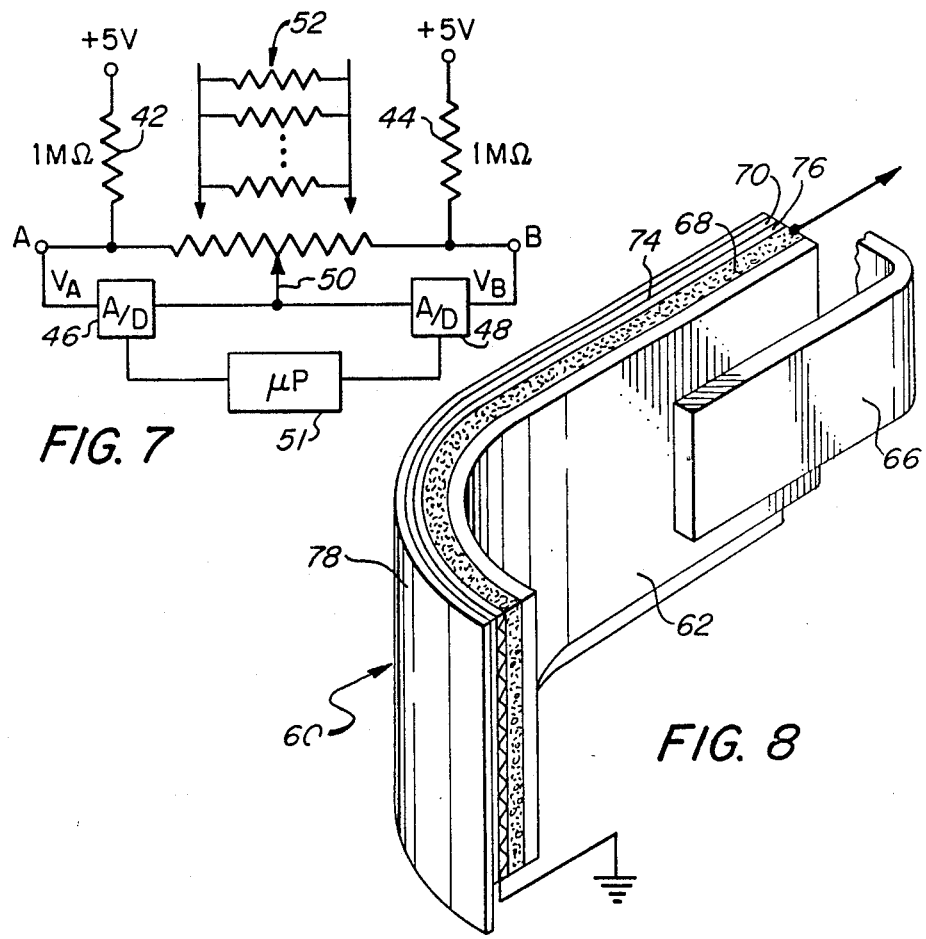
FIG. 7
FIG. 8

BUMPER FOR IMPACT DETECTION

BACKGROUND OF THE INVENTION

While the invention is subject to a wide range of applications, it is particularly suited for a moving vehicle requiring bumpers. In particular, a vehicle such as a mobile robot which incorporates the bumper of the present invention is able to navigate by sensing both the force and the position of a collision with an object.

Bumpers for obtaining tactile sensory information from the perimeters of associated autonomous mobile robots or platforms, for the purpose of impact detection and collision avoidance, are well known in the prior art. The prior art tactile bumpers for accomplishing the foregoing generally consist of independent and discrete elements arranged in a discontinuous fashion around the mobile robot or platform being protected.

One such prior art bumper, disclosed in U.S. Pat. No. 3,599,744, is connected by a hinge to a vehicle. The bumper is formed of an elastically deformable material. When the bumper contacts an obstruction, it pivots about hinge pins and opens a switch causing the vehicle to decelerate or brake. This bumper is not able to distinguish the location or force of contact with the bumper.

It is also known in the prior art to provide a bumper which is able to determine the position of an obstacle relative to the vehicle. For example, U.S. Pat. No. 4,546,840 discloses a metal bumper having an obstacle contact sensor comprising a conductive rubber member sandwiched between a protective thin metal film and an electrode plate. The electrode plate has a plurality of electrode surfaces in contact with the metal bumper. Compression of the rubber member electrically grounds the corresponding electrode surface through the conductive rubber having a reduced electrical resistance whereby the electrical potential of the electrode surface is lowered. A resulting electrical signal enables the presence of an obstacle to be sensed. In addition, the location of where the obstacle contacts the vehicle body can be sensed with the switch mechanism on the electrode surface. The '840 patent does not disclose a means to determine the force of contact between the bumper and the obstacle.

Another prior art bumper for a mobile robot is disclosed in U.S. Pat. No. 4,596,412. The prior art bumper disclosed therein is configured to obtain sensory information for impact detection and collision avoidance from the entire perimeter of an associated autonomous mobile robot or platform.

The prior art, as indicated hereinabove, includes some advancements in bumpers for impact detection and collision avoidance. However, insofar as can be determined, no prior art tactile bumper incorporates all of the features and advantages of the present invention.

It is a problem underlying the present invention to determine both the position and force of impact on a bumper attached to a vehicle.

It is an advantage of the present invention to provide a bumper for impact detection which obviates one or more of the limitations and disadvantages of the described prior arrangements.

It is a further object of the present invention to provide a bumper for impact detection which can sense the location of contact with an obstacle.

It is a still further object of the present invention to provide a bumper for impact detection which can sense the force of impact with an obstacle.

It is yet another advantage of the present invention to provide a bumper for impact detection which can sense a very low force of impact.

It is a still further advantage of the present invention to provide a bumper for impact detection which is relatively inexpensive to manufacture.

Accordingly, there has been provided a bumper for impact detection with an object. An electrically conductive member has a compressible, electrically conductive material mounted thereto. An insulator formed of mesh material is sandwiched between the electrically conductive member and the electrically conductive material for electrically insulating the conductive member from the conductive material when the material is in a non-compressed state and for providing electrical conduction between the conductive member and the conductive material when the conductive material is in a compressed state.

BRIEF DESCRIPTION OF THE DRAWINGS

The invention and further developments of the invention are now elucidated by means of preferred embodiments shown in the drawings:

FIG. 5 is a schematic top view of the bumper for impact detection illustrating a slight collision with an obstacle;

FIG. 7 is a schematic of an electrical equivalent of a bumper in accordance with the present invention; and FIG. 8 is a perspective view of a second embodiment of a bumper for impact detection.

DETAILED DESCRIPTION OF THE PREFERRED EMBODIMENT

Figure 1:
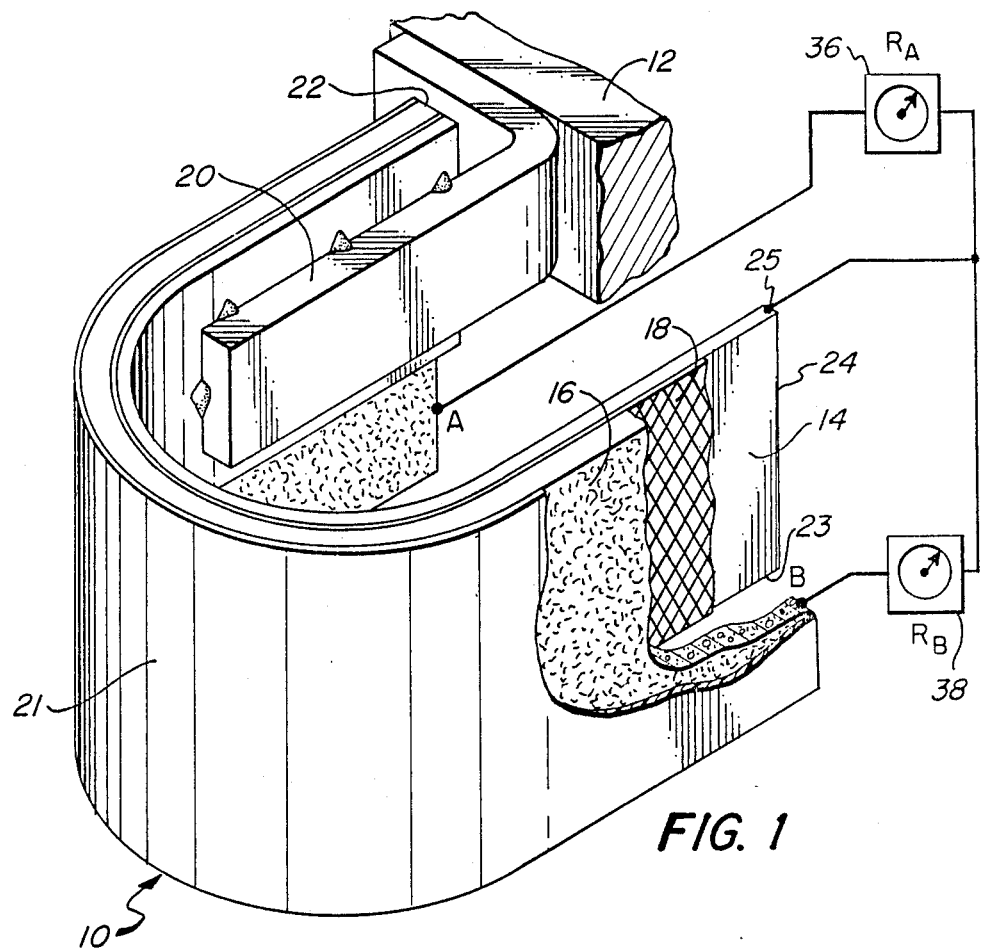
FIG. 1 is a perspective view of a bumper for impact detection attached to a vehicle.

Referring to FIG. 1, there is illustrated a bumper 10 for impact detection with an obstacle. The bumper comprises an electrically conductive member 14. A compressible, electrically conductive material 16 is mounted to the conductive member 14. A component 18 electrically insulates the conductive member 14 from the conductive material 16 when the conductive material 16 is in a non-compressed state and provides electrical conduction from said conductive member 14 to said conductive material 16 when the conductive material 16 is in a compressed state.

Referring again to FIG. 1, a physical representation of the bumper 10 in accordance with the present invention is provided. The bumper can be attached to a vehicle 12 by any desired means such as a weldment 20. Also, the bumper is illustrated as having a U shape. However, it is within the terms of the present invention to shape the bumper 10 in any desired configuration and to surround any portion or the entire perimeter of the vehicle 12 with the bumper.

The bumper 10 includes an inner, electrically conductive member 14 which forms an inner (back) plate that can be attached to the vehicle 12. The plate can be constructed of any rigid conductive material such as a metal or alloy selected from the group comprising iron, steel, copper, brass, aluminum alloys thereof, as well as metal impregnated plastic and a plastic having a metallized surface coating.

A compressible, electrically conductive material 16 is mounted to the electrically, conductive back plate 14. The conductive material 16 is preferably a low density foam which serves as both an electrical conductor for sensing the position and force of impact with an obstacle or object, as well as a mechanical force-absorber for stopping the vehicle. The foam has resistive properties in the range of about 10 to about 1000 kilohms per foot, such as anti-static, conductive foam packaging CP 105 from Charles Water Products, Inc., Newton, MA. Other materials which will provide anti-static control and function as the conductive material are conductive polyethylene CP 501 from Charles Water Products, Inc., conductive foams No. 1927T71 to 1927T76 from McMaster-Carr Supply Company of New Brunswick, New Jersey, and electrically conductive paper No. 2094T41 from McMaster-Carr Supply Co. Although the present invention is discussed in terms of the foam, it is within the terms of the present invention to substitute any anti-static, compressible, electrically conductive material.

The insulating means 18 comprises a mesh material having openings sized to prevent accidental contact between the conductive member 14 and the conductive material 16 while allowing contact between the conductive member and the conductive material from a light impact. The openings in the mesh can be of any desired shape including but not limited to circles, triangles, squares and oblong openings. The mesh can have a resolution from about 0.01 inches (the center-to-center repetition rate) to about 1 foot or more. The dimension of the mesh openings is preferably on the order of 1/10 of the mesh thickness. The mesh can be formed of any insulating material selected from the group comprising polyethylene, nylon, plastic, fiberglass, and rubber.

The conductive foam 16 has a protective cover sheet 21 formed of a flexible material to protect the underlying foam from physical damage and may be formed from electrically insulative material. The cover sheet 21 can be constructed of various materials such as polyethylene, nylon, plastic, natural latex, fiberglass, nitrile and silicone rubber. The conductive foam 16 and the cover sheet 21 project outward from an edge 23 of the back (inner) plate 14. The section of conductive foam 16 which is not supported by the back plate 14 provides sensitive position detection as will be discussed hereinafter.

To better understand the operation of bumper 10 illustrated in FIG. 1, a general and then more detailed explanation of its operation follows.

Two ohmmeters 36 and 38 are illustrated as connected to points A and B at opposite ends of the conductive material 16. The ohmmeters are also commonly connected to the conductive member 14 at a common, or ground, point 25. The ground point 25 can be at any suitable location on the conductive back plate 14. By measuring the resistance between the points A and B on the foam material 16, a collision of the bumper with an object can be detected and the point 27 (see FIG. 5) of impact on the bumper 10 determined. Before the bumper 10 is impacted, the insulating mesh 18 separates the foam sheet 16 from the back plate 14 and an open circuit or an infinite resistance exists between the points A and B. When impact occurs, the foam material 16 is forced to make contact at the point 29 (see FIG. 5) with the back plate 14 through the holes of the insulating mesh 18. Measured resistances $R_A$ and $R_B$ correspond to the resistance of the length of foam material 16 between the points A and B on the foam material and the point 29 of impact, respectively. The resistance varies linearly across the length of the bumper, $R_A$ being lowest when the impact point 27 is closest to the point A and highest when the impact point 27 is at the point B. Similarly, $R_B$ being lowest when the impact point 27 is closest to the point B and highest when the impact point 27 is at the point A. The position of the impact point 27 can be determined from $R_A$ and $R_B$. In addition, by measuring the absolute resistances, $R_A$ and $R_B$, the force (F) of impact can be determined.

Figure 2:
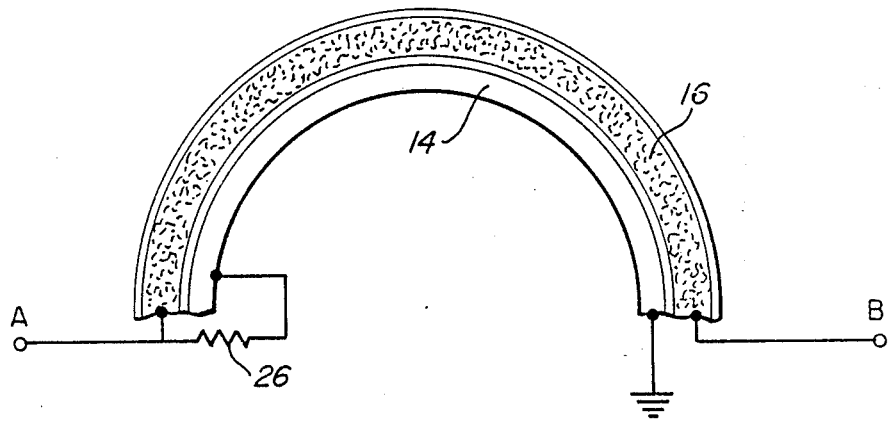
FIG. 2 is a schematic illustration of a top view of the bumper for impact detection.
Figure 3:
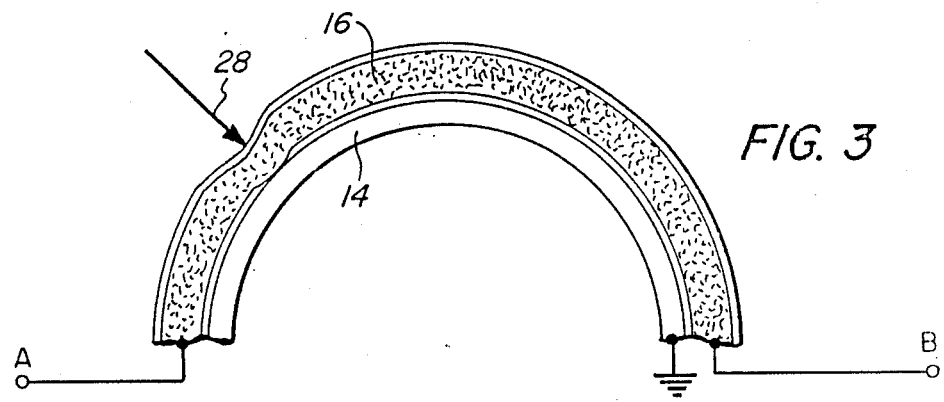
FIG. 3 is a schematic top view of the bumper for impact detection illustrating a collision with an obstacle.
Figure 6:
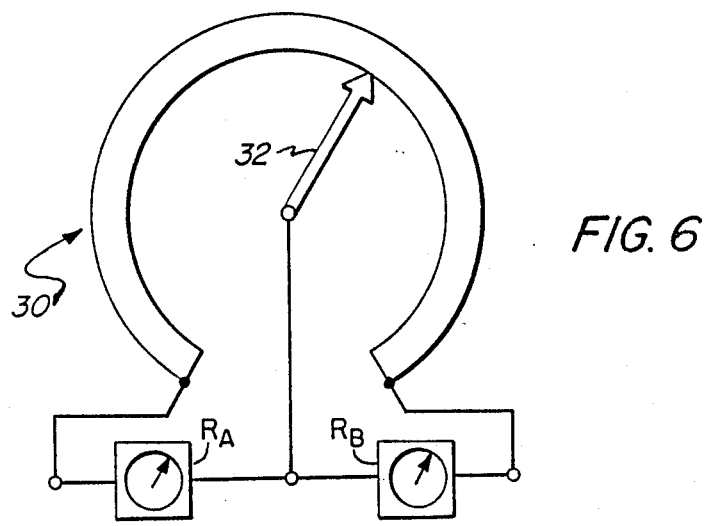
FIG. 6 is a schematic illustration of a conventional potentiometer.

The foam 16 used in bumper 10 has a relatively high impedance. The basic principle associated with this bumper corresponds to the operation of a conventional potentiometer as schematically represented in FIG. 6. Under normal circumstances, when the bumper 10 has not contacted an obstacle, the resistance to ground at the opposite ends 22 and 24 of the bumper 10 is very high. At that time, only a very high leakage resistance can be measured as indicated by the resistor 26, see FIG. 2. At impact with an obstacle, the portion of foam 16 near the point of impact is grounded against the plate 14 as illustrated in FIG. 3. A resistance change will be effected and indicated (a signal produced) at points A and B. Assuming a collision with an obstacle indicated by arrow 28 (see FIG. 3), the resistance to ground value at point A will be lower than the value indicated at point B.

Figure 4:
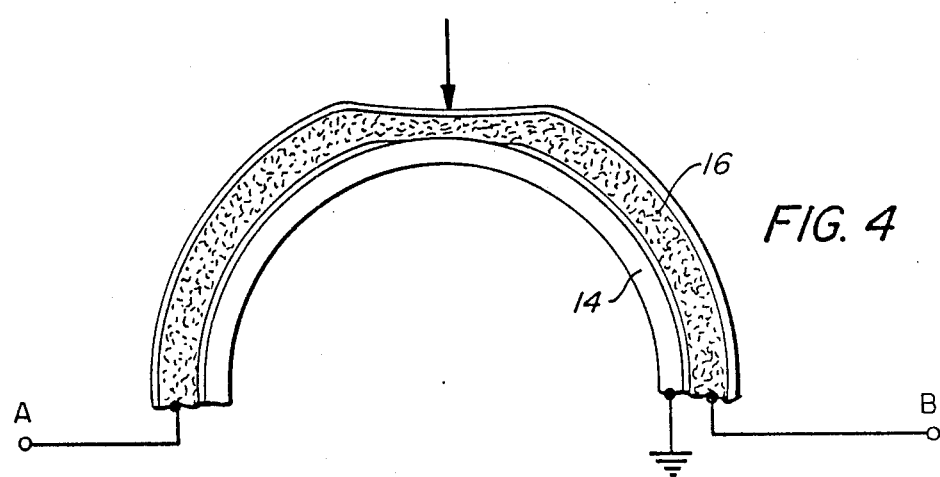
FIG. 4 is a schematic top view of the bumper for impact detection illustrating a hard collision with an obstacle.

In the case of a collision in the middle of the bumper, as illustrated in FIG. 4, an equal resistance to ground values at point A and B will be registered.

The conventional potentiometer 30 illustrated in FIG. 6 operates under the same principle and the sliding part 32, known as the glider, is equivalent to the point of contact of the conductive back plate 14 with foam 16.

It should be understood that the resistances $R_A$ and $R_B$ at the points A and B, respectively, may be represented by signals, as shown in FIG. 7, discussed hereinafter.

Another aspect of the present invention relates to the measurement of the force of impact with the obstacle. A light impact of the bumper with an obstacle is represented in FIG. 5. Here, the total area of contact between the foam 16 and the back plate 14 is small. Hence, the absolute value of the resistances $R_A$ and $R_B$ to ground is relatively high.

On the other hand, as illustrated in FIG. 4, when a hard collision occurs, the area of contact between the foam 16 and back plate 14 is much greater. Then, the absolute value of the resistances $R_A$ and $R_B$ to ground is much lower since a larger portion of the foam is grounded. Therefore, by measuring the absolute value of resistance at points A and B, the force (F) of impact caused by the collision can be determined. This principle is illustrated in FIG. 7.

An electrical equivalent of the physical structure of the bumper 10 is illustrated in FIG. 7. A voltage (+5v) is applied to the ends A and B of the foam through pull-up resistors 42 and 44. The conductive foam 16 now acts as a voltage divider with respect to the voltage developed across points A and B insofar as the contact point of the foam to ground is concerned.

To locate the point of impact on the bumper, the signals at A and B are analyzed. Analog-to-digital (A/D) converters 46 and 48 corresponding to the ohmmeters 36 and 38 (FIG. 1) are connected to the points A and B respectively. In addition, the A/D converters 46, 48 are connected to the grounding arrow 50. As the arrow 50, corresponding to the point of collision moves closer to the A end of the circuit, the voltage signal in the A/D converter 46 will increase while the voltage signal in the A/D converter 48 will proportionately decrease. If the pointer 50 moves towards the point B, the signal from A/D device 48 will increase while the signal in A/D device 46 will proportionately decrease. The outputs of the A/D devices 46, 48 are provided to a microprocessor 51.

In the example of the circuit illustrated in FIG. 7, the voltages $V_A$ and $V_B$ of 0–5 volts DC correspond to digital outputs for the A/D converters 46 and 48 of 0–255. In the case of no collision, a +5 volt signal picked up by the A/D converters 46 and 48 indicate a value of 255. For noise immunity reasons, the top 10% of the maximum value, i.e. 230–255 will indicate that no collision has occurred.

From a force point of view, the absolute value resistance of the foam is decisive for force indication. The foam can be looked upon as a volume resistor, or consisting of several small resistors in parallel. The more the foam is compressed, the lower its resistance. The compression reduces the parallel path cross section. This is illustrated by a plurality of resistors 52 illustrated in FIG. 7. By adding more resistors in parallel which corresponds to compressing the foam, the absolute values of the resistances $R_A$, $R_B$ are decreased, and the voltages $V_A$, $V_B$ are increased.

The microprocessor 51 receives the signals from the A/D devices 46 and 48 to calculate the position and the force of impact. Although the microprocessor 51 can be mounted in any convenient location with respect to the bumper 10, it is within the terms of the present invention to bury it within the conductive foam.

Referring again to FIG. 1, the points A and B discussed hereinbefore, are represented at the opposite ends of the conductive foam 16. Connected to each of these points are ohmmeters 36 and 38 which correspond to the analog/digital converters 46 and 48, respectively, illustrated in FIG. 7. The ohmmeters are connected to the ground point 25 on plate 14. The meter readings corresponding to resistance signals at A and B which in turn correspond to the position and force of impact with an obstacle, as discussed hereinbefore.

The sensitivity of the bumper is determined by the impact absorbing characteristics of the protective cover as well as the mesh size and strand thickness of the insulating mesh. If a thin mesh and a thin, highly flexible protective cover is used, the bumper will respond very quickly to a light impact. Increasing the thickness of protective cover and/or the insulating mesh will decrease the bumper's sensitivity since a harder impact will be required to press the conductive foam into contact with the back plate. The bumper disclosed herein is generally responsive to an impact force of a fraction of an ounce to several hundred pounds. Preferably, the bumpers disclosed herein are responsive to a force of less than one ounce to about 100 pounds.

Referring to FIG. 8, there is illustrated a second embodiment of the present invention. A bumper 60 is provided with a back plate 62 which can be contructed of any rigid, insulator material such as molded plastic. The back plate can be attached to any component such as a vehicle by a plate 66. Although a particular configuration for the plate 66 is illustrated, it is within the terms of the invention to use any conventional means of connecting the bumper to a desired structure. Adjacent to back plate 62 is conductive foam 68 of the type described hereinbefore in conjunction with the first embodiment. A conductive mylar sheet 70 is provided with an electrical conductor on the surface 74 facing the conductive foam 68. For example, the mylar sheet can have an aluminized surface 74, although any conductive material will suffice.

Sandwiched between the conductive mylar sheet 70 and the foam 68 is a mesh material 76 which is substantially the same as the mesh material described hereinbefore in conjunction with the first embodiment. Finally, a protective cover 78 is provided on the outer surface of the mylar sheet. The protective cover 78 is preferably formed of a moderately compliant material such as polyethylene or any of the cover materials described with respect to the embodiment illustrated in FIG. 1. The cover sheet 78 extends outward from the mylar sheet 70 in order to provide protection for the materials forming the other components of the bumper.

The bumper 60 operates in essentially the same manner as the bumper 10 described hereinbefore. An impact with an obstacle presses the conductive surface 74 of the mylar sheet through the mesh 76 and against the foam 68 whereby the position and amount of force can be determined in accordance with the principles described hereinbefore.

The bumpers 10 and 60 are advantageously employed as contact sensors for mobile robots. The position information can be used in navigation algorithms to plan a path around an obstacle based on the detected location. The high sensitivity afforded by the mylar 70 allows the robot to react as quickly as possible to a collision, minimizing the force of impact.

Advantages of the bumpers 10 and 60 include their low-cost design which enables them to be used in autonomous ground vehicles as well as in toy robots, their ruggedness because they consist of so few parts, their simplicity of design, and their construction from readily available parts.

The general principle of operation for the bumper is applicable to any form of use, where position and/or force are important to measure. Some applications include fencing where security surveillance can locate an intruder climbing over the fence, and measuring the force and position of a machine tool or industrial robot hand.

The patents set forth in this application are intended to be incorporated by reference herein.

It is apparent that there has been provided in accordance with this invention a bumper for impact detection and the method of detecting impact which satisfies the objects, means, and advantages set forth hereinabove. While the invention has been described in combination with the embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A bumper for impact detection with an object, comprising:
   an electrically conductive member;
   a compressible, electrically conductive material mounted adjacent said conductive member and having two ends;
   means for electrically insulating said conductive member from said conductive material when said conductive material is non-compressed but allowing an electrical connection between said conductive member and said conductive material when said conductive material is compressed at a point of impact with the object; and
   means for determining a position of the point of impact based on electrical measurements taken at the ends of the conductive material.

2. The bumper of claim 1 wherein said insulating means is sandwiched between said electrically conductive member and said compressible, electrically conductive material.

3. The bumper of claim 2 wherein said compressible, electrically conductive material has a resistance of about 10 to about 1000 kilohms per foot.

4. The bumper of claim 1 wherein the electrically conductive material is constructed of an anti-static material.

5. The bumper of claim 1 further including:
   means for attaching the bumper to a vehicle.

6. The bumper of claim 1 further including a flexible, protective cover sheet disposed on a surface of the electrically conductive material.

7. The bumper of claim 6 wherein said cover sheet is an electrical insulator.

8. The bumper of claim 1 further including means connected to said conductive member and to the two ends of said conductive material for providing signals indicative of contact between the conductive member and the conductive material.

9. The bumper of claim 8 further including means responsive to said signals for determining force and position of impact of the bumper with the object.

10. The bumper of claim 1 further comprising:
    means connected to said conductive member and to the ends of said conductive material for providing a first signal indicative of a resistance ($R_A$) between said conductive member and one end of said conductive material and for providing a second signal indicative of a resistance ($R_B$) between said conductive member and the other end of said conductive material.

11. The bumper of claim 10 wherein the means for providing the first and second signals includes a first analog-to-digital converting device for providing the first signal and a second analog-to-digital converting device for providing the second signal.

12. The bumper of claim 1 wherein said compressible, electrically conductive material projects outward beyond the electrically conductive member.

13. A bumper for impact detection with an object, comprising:
    an electrically conductive member;
    a compressible, electrically conductive material mounted adjacent to said conductive member; and
    means for electrically insulating said conductive member from said conductive material when said conductive material is non-compressed but allowing an electrical connection between said conductive member and said conductive material when said conductive material is compressed;
    wherein said insulating means is sandwiched between said electrically conductive member and said compressible, electrically conductive material; and
    wherein said insulating means comprises a mesh material having openings sized to prevent accidental contact between said conductive member and conductive material while allowing contact between the conductive member and material from an impact with the object.

14. The bumper of claim 13 wherein said mesh is constructed from a flexible material.

15. A method useful in detecting impact of a vehicle with an object comprising:
    providing a bumper on a vehicle;
    providing an electrically conductive member on the bumper;
    providing a compressible, electrically conductive material adjacent to the conductive member;
    electrically insulating the conductive member from the conductive material when the conductive member is non-compressed; and
    allowing electrical conduction between said conductive member and said conductive material in response to compression of said conductive material resulting from impact of the vehicle with the object.

16. The method of claim 15 further including the step of determining both a position of impact and a force of impact caused by the impact of the object with the bumper.

17. The method of claim 16 including the step of affixing a flexible, protective cover sheet to an outer surface of the electrically conductive material.

18. The method of claim 15 including the step of providing a first signal indicative of a resistance ($R_A$) between said conductive member and one end of said conductive material and for providing a second signal indicative of a resistance ($R_B$) between said conductive member and another end of said conductive material.

19. The method of claim 18, further comprising:
    determining a force of impact of the object with the bumper based on absolute values of the first and second signals.

20. The method of claim 18, further comprising:
    determining a position of impact of the object with the bumper based on a difference between the first and second signals.

21. A bumper for impact detection with an object, comprising:
    an electrically non-conductive back plate;
    a compressible, electrically conductive material mounted to said back plate and having two ends;
    an electrically conductive member disposed adjacent said electrically conductive material; and
    means for electrically insulating said conductive member from said conductive material when said conductive material is non-compressed but allowing an electrical connection between said conductive member and said conductive material when said conductive material is compressed at a point of impact with the object; and
    means for determining a position of the point of impact based on electrical measurements taken at the ends of the conductive material.

22. The bumper of claim 21 wherein said insulating means is sandwiched between said electrically conductive member and said compressible, electrically conductive material.

23. The bumper of claim 21 including a flexible, protective cover sheet disposed on a surface of the electrically conductive material.

24. The bumper of claim 21 wherein the electrically conductive material is constructed of an anti-static material.

25. The bumper of claim 21 wherein said electrically conductive member is constructed of mylar with a metallized surface.

26. The bumper of claim 21 further including
means for attaching the bumper to a vehicle.

27. The bumper of claim 21 further including means connected to said conductive member and to the ends of said conductive material for providing signals indicative of contact between the conductive member and the conductive material.

28. The bumper of claim 27 further including means responsive to said signals for determining force and position of impact of the bumper with the object.

29. A bumper for impact detection with an object, comprising:

an electrically non-conductive back plate;
a compressible, electrically conductive material mounted to said back plate;
an electrically conductive member disposed adjacent said electrically conductive material; and
means for electrically insulating said conductive member from said conductive material when said conductive material is non-compressed but allowing an electrical connection between said conductive member and said conductive material when said conductive material is compressed;
wherein said insulating means is sandwiched between said electrically conductive member and said compressible, electrically conductive material; and
wherein said insulating means comprises a mesh material having openings sized to prevent accidental contact between said conductive member and said conductive material while allowing contact between the conductive member and material from an impact with the object.

30. The bumper of claim 29 wherein said mesh is constructed from a flexible material.

* * * * *